United States Patent
Lee et al.

(10) Patent No.: US 11,789,773 B2
(45) Date of Patent: Oct. 17, 2023

(54) COMPUTING DEVICE FOR HANDLING TASKS IN A MULTI-CORE PROCESSOR, AND METHOD FOR OPERATING COMPUTING DEVICE

(71) Applicant: SAMSUNG ELECTRONICS CO., LTD., Suwon-si (KR)

(72) Inventors: Young Tae Lee, Suwon-si (KR); Soo Hyun Kim, Yongin-si (KR); Jong-Lae Park, Anyang-si (KR); Choong Hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 366 days.

(21) Appl. No.: 16/444,632

(22) Filed: Jun. 18, 2019

(65) Prior Publication Data

US 2020/0160120 A1    May 21, 2020

(30) Foreign Application Priority Data

Nov. 15, 2018   (KR) .......................... 10-2018-0140627

(51) Int. Cl.
   *G06F 9/46*    (2006.01)
   *G06F 9/48*    (2006.01)
   *G06F 9/50*    (2006.01)

(52) U.S. Cl.
   CPC .......... *G06F 9/4881* (2013.01); *G06F 9/4856* (2013.01); *G06F 9/5027* (2013.01)

(58) Field of Classification Search
   None
   See application file for complete search history.

(56) References Cited

U.S. PATENT DOCUMENTS

| | | | |
|---|---|---|---|
| 8,397,235 B2 * | 3/2013 | Dong | G06F 9/4887 718/100 |
| 9,015,726 B2 | 4/2015 | Barsness et al. | |
| 9,043,798 B2 | 5/2015 | Calcaterra et al. | |

(Continued)

FOREIGN PATENT DOCUMENTS

| | | |
|---|---|---|
| JP | 2006-268754 A | 10/2006 |
| JP | 2015-49550 A | 3/2015 |

OTHER PUBLICATIONS

Kuo et al; Scheduling Algorithm Considering Response Time for Mixed Tasks on Multiprocessor Systems, ACM 2016 (Year: 2016).*

(Continued)

*Primary Examiner* — Bing Zhao
(74) *Attorney, Agent, or Firm* — Sughrue Mion, PLLC

(57) ABSTRACT

A computing device and a method for operating the computing device are provided. The computing device includes a task classifying module and a task allocating and managing module. The task classifying module classifies a task scheduled to be processed by a multi-core processor into an expectable task or a normal task. The task allocating and managing module selects one core of the multi-core processor as a target core and allocates the task scheduled to be processed to the target core. In response to the task scheduled to be processed being classified as the normal task, the task allocating and managing module determines whether to allocate the normal task to the target core depending on whether the target core processes a previously allocated expectable task.

23 Claims, 15 Drawing Sheets

(56) References Cited

U.S. PATENT DOCUMENTS

| | | |
|---|---|---|
| 9,298,504 B1 | 3/2016 | Vincent |
| 9,552,230 B2 | 1/2017 | Jeong et al. |
| 9,612,878 B2 | 4/2017 | Di Balsamo et al. |
| 2002/0120663 A1* | 8/2002 | Binns ............... G06F 9/4887 |
| | | 718/103 |
| 2010/0088706 A1 | 4/2010 | Dong et al. |
| 2015/0067688 A1* | 3/2015 | Nagasawa ............ G06F 9/4881 |
| | | 718/102 |
| 2016/0119248 A1 | 4/2016 | Dey et al. |

OTHER PUBLICATIONS

Banus et al; Dual Priority Algorithm to Schedule Real-Time Tasks in a Shared Memory Multiprocessor, IEEE 2003 (Year: 2003).*
Communication dated Nov. 21, 2022 issued by the Korean Intellectual Property Office in Korean Patent Application No. 10-2018-0140627.

* cited by examiner

COMPUTING DEVICE FOR HANDLING TASKS IN A MULTI-CORE PROCESSOR, AND METHOD FOR OPERATING COMPUTING DEVICE

CROSS-REFERENCE TO RELATED APPLICATION

This application claims priority from Korean Patent Application No. 10-2018-0140627, filed on Nov. 15, 2018, in the Korean Intellectual Property Office, the disclosure of which is incorporated by reference herein in its entirety.

BACKGROUND

1. Field of the Disclosure

The present disclosure relates to a computing device and a method for operating the computing device.

2. Description of the Related Art

A multi-core processor includes a plurality of cores, and when tasks scheduled to be processed by the multi-core processor are generated, the scheduler allocates the tasks to be processed to the plurality of cores of the multi-core processor.

Among tasks, some tasks have a pattern that is repeated at a constant cycle, or a pattern repeated many times.

SUMMARY

It is an aspect to provide a computer device and a method for operating the computer device capable of identifying an expectable task among tasks processed by a multi-core processor and capable of distinguishing and scheduling an expectable task and a normal task.

However, aspects of the present disclosure are not restricted to the one set forth herein. The above and other aspects of the present disclosure will become more apparent to one of normal skill in the art to which the present disclosure pertains by referencing the detailed description of the present disclosure given below.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION

Among the tasks scheduled to be processed, for example, tasks such as tasks related to sound and tasks related to a screen update are tasks that are substantially periodically executed, and their execution patterns are relatively constant. For example, tasks related to screen update are executed at fixed time intervals, and operations to be processed each time the tasks are executed are not significantly different from each other. In this way, the tasks having a pattern repeated at a constant cycle, or a pattern repeated many times even if not having a constant cycle are tasks (hereinafter referred to as expectable tasks) for which a future execution start time, an execution time, or the like may be predicted on the basis of the current execution pattern.

In a multi-core processor, when such expectable tasks are handled by the same core as normal tasks, the expectable tasks may be preoccupied by normal tasks or their execution may be delayed. Therefore, in scheduling the tasks in the multi-core processors, it is advantageous to implement a scheme to distinguish and schedule expectable tasks and normal tasks.

Figure 1:
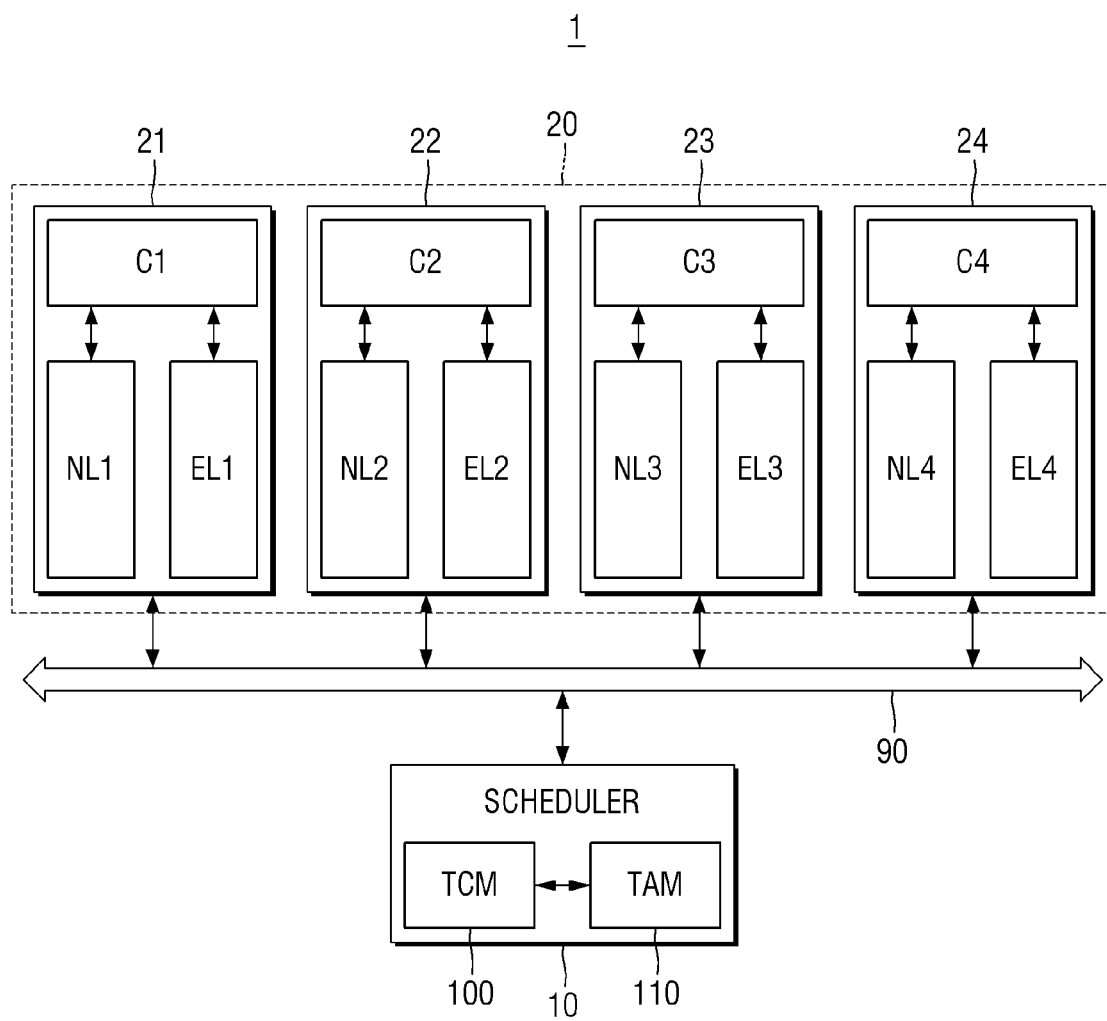
FIG. 1 is a block diagram illustrating a computing device according to an embodiment of the present disclosure.

FIG. 1 is a block diagram illustrating a computing device according to an embodiment of the present disclosure.

Referring to FIG. 1, a computing device 1 according to an embodiment of the present disclosure includes a scheduler 10 and a multi-core processor 20, and a bus 90.

The scheduler 10 schedules one or more tasks to the multi-core processor 20. The scheduler 10 may be implemented as software by one or more microprocessors as a part of an operating system or a kernel which controls the computing device 1, and/or may be implemented as hardware such as an electronic circuit including a semiconductor element configured to perform the task scheduling.

The multi-core processor 20 includes a plurality of cores 21, 22, 23 and 24, each capable of executing a task allocated by the scheduler 10. The plurality of cores 21, 22, 23 and 24 may or may not be implemented to have the same performance as each other. For example, some cores of the plurality of cores 21, 22, 23 and 24 may be implemented to reduce power consumption and reduce performance, and some other cores may be implemented to have high power consumption and high performance.

The plurality of cores 21, 22, 23 and 24 may include expectable task list queues EL1, EL2, EL3 and EL4, respectively, and normal task list queues NL1, NL2, NL3 and NL4, respectively. An expectable task ET allocated by the scheduler 10 may be inserted into the expectable task list queues EL1, EL2, EL3 and EL4, and a normal task NT allocated by the scheduler 10 may be inserted into the normal task list queues NL1, NL2, NL3 and NL4.

Here, the expectable task ET denotes a task for which a future execution may be predicted on the basis of a current execution pattern. For example, the expectable task ET may include a task repeatedly executed with a certain period, a task repeated many times even if not having a certain period, a task inevitably generated when a specific operating condition of the computing device 1 is satisfied, a task specified as an expectable task from the user, and the like. Representative examples of the expectable task ET may include tasks related to sounds and tasks related to updating screens. These tasks are substantially periodically executed tasks, and their execution patterns are relatively constant. However, the scope of the present disclosure is not limited thereto, and any task for which a future execution start time, an execution time, and the like may be predicted on the basis of the current execution pattern may correspond to the expectable task ET.

The plurality of cores 21, 22, 23 and 24 may execute the expectable task ET inserted into the expectable task list queues EL1, EL2, EL3 and EL4, and may execute a normal task NT inserted into the normal task list queues NL1, NL2, NL3 and NL4. In this specification, a case is illustrated in which a plurality of cores 21, 22, 23 and 24 includes the expectable task list queues EL1, EL2, EL3, EL4, respectively, and the normal task list queues NL1, NL2, NL3 and NL4, respectively, and regions C1, C2, C3 and C4 are dividedly illustrated to process the tasks inserted into the expectable task list queues EL1, EL2, EL3 and EL4 and the normal task list queues NL1, NL2, NL3 and NL4. In other words, strictly speaking, semiconductor circuits corresponding to the regions C1, C2, C3 and C4 process the tasks, but for convenience of explanation, the plurality of cores 21, 22, 23 and 24 are described as processing the tasks.

In this embodiment, the scheduler 10 includes a task classifying module (TCM) 100, and task allocating and managing module (TAM) 110.

The task classifying module 100 classifies the tasks to be processed by the multi-core processor 20 into an expectable task ET and a normal task NT.

The task allocating and managing module 110 selects one core of the multi-core processor 20 as a target core, and allocates the expectable task ET and the normal task NT to the target core. The target core selected here may be, for example, a core 22. Hereinafter, for convenience of explanation, it is assumed that the selected target core is the core 22, but it will be understood that the scope of the present disclosure is not limited thereto.

In the present embodiment, the task allocating and managing module 110 decides whether the normal task NT is allocated to the target core 22, depending on whether the target core 22 processes the expectable task ET.

For example, when the scheduler 10 allocates the normal task NT to the target core 22 in a situation in which the target core 22 processes the expectable task ET that should be processed periodically, there may be problems such as preoccupancy and delay. Specifically, when the processing priority of the normal task NT is higher than that of the expectable task ET already allocated to the target core 22, since the target core 22 interrupts processing of the expectable task ET and processes the normal task NT, problems such as preoccupancy and delay of the expectable task ET may occur. If the expectable task ET is a task of periodically updating the screen, such a problem may become a problem that affects the user by delaying the screen updating.

In addition, even if the expectable task ET is executed repeatedly, but when the load thereof is small, if the scheduler 10 decides that the load of the target core 22 is small to successively allocate the normal task NT to the target core 22, the above-mentioned problem repeatedly occurs.

In order to address such a problem, the scheduler 10 according to various embodiments of the present disclosure includes a task classifying module 100 and a task allocating and managing module 110, which will be described in detail below.

Figure 2:
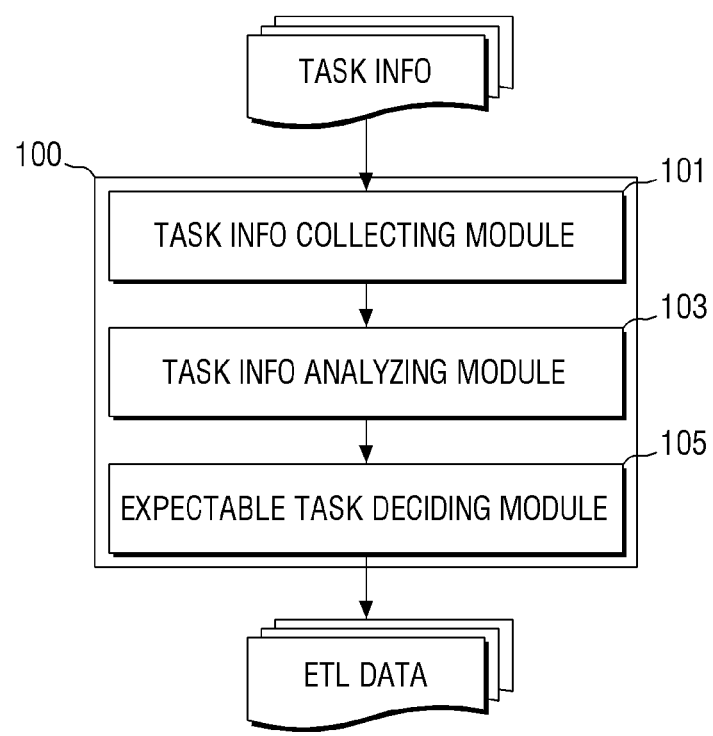
FIG. 2 is a block diagram illustrating a task classifying module of the computing device according to an embodiment of the present disclosure.

FIG. 2 is a block diagram illustrating the task classifying module of the computing device according to an embodiment of the present disclosure.

Referring to FIG. 2, the task classifying module 100 of the computing device 1 according to an embodiment of the present disclosure includes a task information collecting module 101, a task information analyzing module 103, and an expectable task deciding module 105.

The task information collecting module 101 collects information (TASK INFO) on the task scheduled to be processed. Here, the information (TASK INFO) on the task scheduled to be processed includes, for example, various kinds of information, such as task creation information on an initial creation operation of the task, task creation time information, task enqueue information on the operation of allocating the task to a processor (or CPU (Central Processing Unit), core), task load update information on the operation of calculating the load of the task allocated to the processor (or CPU, core), task dequeue information on the operation of deleting the allocated task from the processor (or CPU, core), task dead information on the termination and extinction operation of task, and other user specified parameter information, and the information may vary depending on the purpose of use implementation.

The task information analyzing module 103 analyzes the information collected by the task information collecting module 101. That is, the task information analyzing module 103 may analyze the aforementioned information to generate information for predicting a future task execution pattern.

For example, the task information analyzing module 103 may analyze the collected information to derive the execution time prediction information and the next start time prediction information on the task scheduled to be processed. That is, when the task scheduled to be processed is executed in the future, it is possible to derive prediction information on, for example, how long the execution time will take, at which cycle the task will be repeatedly executed, and how many times the task will be executed repeatedly.

The expectable task deciding module 105 classifies the task scheduled to be processed into the expectable task ET and the normal task NT on the basis of the analysis result of the task information analyzing module 103.

For example, the expectable task deciding module 105 may classify the task scheduled to be processed into the expectable task ET and the normal task ET, on the basis of at least one of execution time prediction information and the next start time prediction information NT. That is, the task scheduled to be processed in which the execution time, the next start time, the number of times of repetition, and the like are decided to have an expectable execution pattern may be classified as the expectable task ET, and the task scheduled to be processed which is a one-time task or in which a particular execution pattern is not found may be classified as the normal task NT.

In the present embodiment, the expectable task deciding module 105 may output expectable task list data ETL, as a result of classifying the task scheduled to be processed into the expectable task ET and the normal task NT. The expectable task list data ETL may be used for an expectable task managing module 111 of a task allocating and managing module 110 to be described later to manage the expectable task ET. However, the scope of the present disclosure is not limited thereto, and the expectable task deciding module 105 may output the result of classifying the task scheduled to be processed into the expectable task ET and the normal task NT in any form which is recognizable by the expectable task managing module 111.

Figure 3:
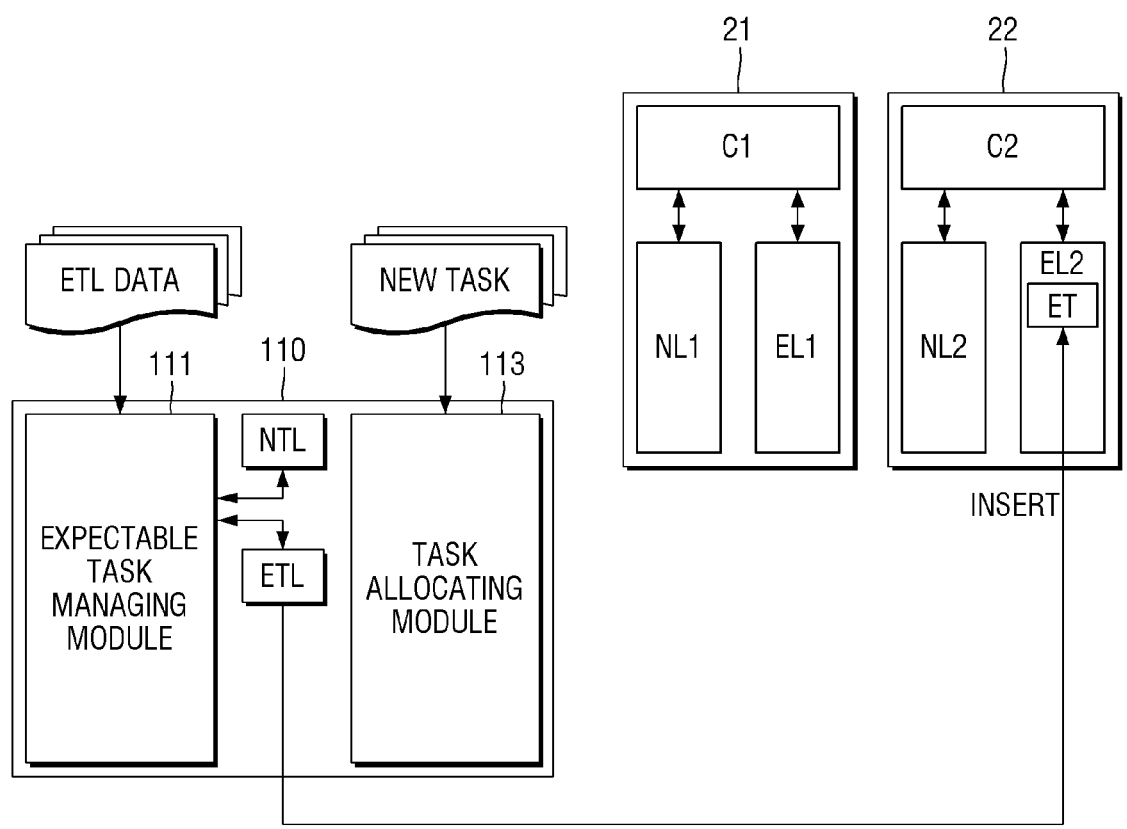
FIGS. 3 and 4 are block diagrams illustrating an expectable task managing module in a task allocating and managing module of the computing device according to an embodiment of the present disclosure.
Figure 4:
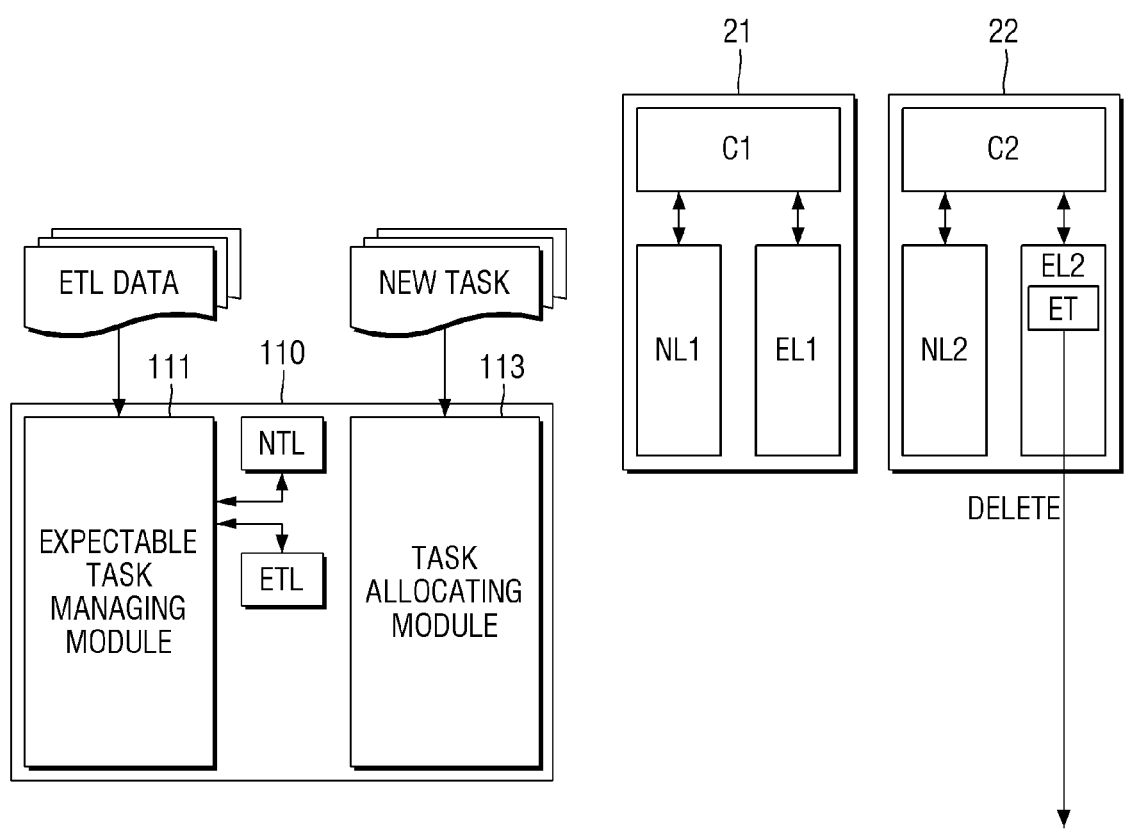

FIGS. 3 and 4 are block diagrams for explaining the expectable task managing module in the task allocating and managing module of the computing device according to an embodiment of the present disclosure.

Referring to FIGS. 3 and 4, the task allocating and managing module 110 of the computing device 1 according to an embodiment of the present disclosure includes an expectable task managing module 111.

The expectable task managing module 111 manages the expectable task ET and the normal task NT classified by the task classifying module 100, using the expectable task list ETL and the normal task list NTL. The expectable task list ETL and the normal task list NTL may be a data structure of any type, such as a queue, a stack, a linked list, and a table, which may be implemented in the task allocating and managing module 110.

The expectable task list ETL stores a list of the expectable tasks ET classified by the task classifying module 100, and the normal task list NTL stores a list of normal tasks NT classified by the task classifying module 100. As illustrated in FIG. 3, the task scheduled to be processed corresponding to the expectable task list ETL may be inserted into, for example, the expectable task list queue EL2 of the core 22, and as illustrated in FIG. 4, the core 22 may execute the expectable task ET inserted into the expectable task list queue EL2.

Figure 5:
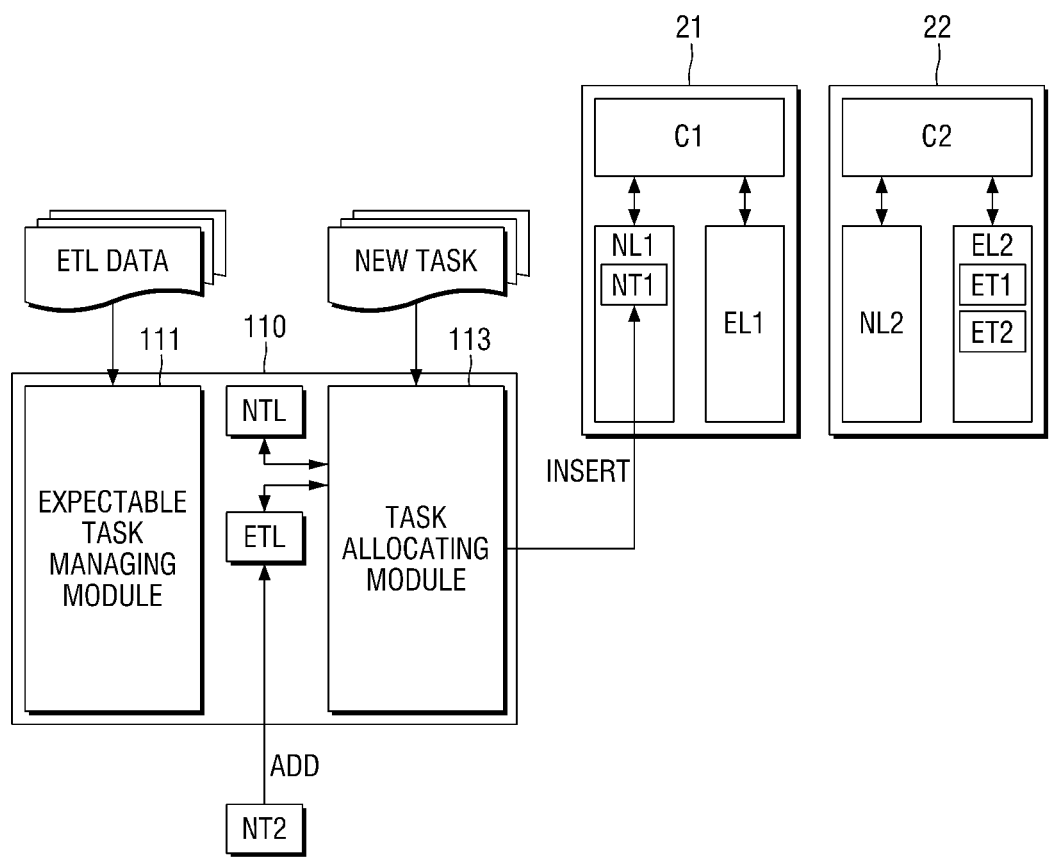
FIGS. 5 and 6 are block diagrams illustrating a task allocating module in the task allocating and managing module of the computing device according to an embodiment of the present disclosure.
Figure 6:
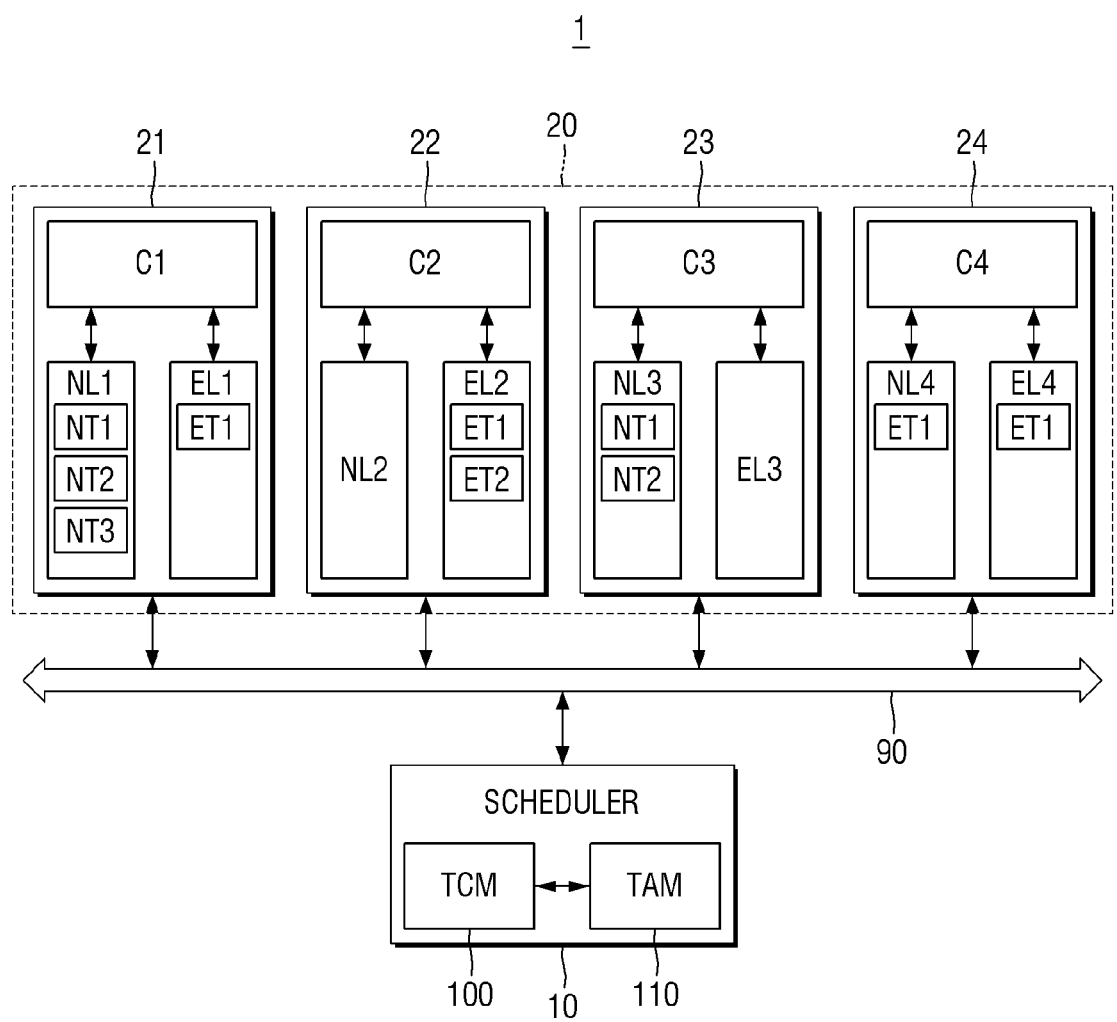

FIGS. 5 and 6 are block diagrams for explaining the task allocating module in the task allocating and managing module of the computing device according to an embodiment of the present disclosure.

Referring to FIG. 5, the task allocating and managing module 110 of the computing device 1 according to an embodiment of the present disclosure includes a task allocating module 113.

The task allocating module 113 allocates expectable tasks ET and normal tasks NT to the target cores 21 and 22, using the expectable task list ETL and the normal task list NTL. In particular, the task allocating module 113 may receive input of a new task (NEW TASK) and allocate the new task to the target cores 21 and 22.

The task allocating module 113 may designate a new task as a normal task NT as default when receiving a new task. Thereafter, the task allocating module 113 may search for a core among the plurality of cores 21-24 to which a new task is to be allocated in the multi-core processor 20.

When the task allocating module 113 initially selects the target core 22 as the core to which a new task NT1 designated as the normal task NT is allocated, if the target core 22 is already processing an expectable task ET or the expectable tasks ET1 and ET2 are already inserted into the expectable task list queue EL2 of the target core 22 (as shown in FIG. 5), the task allocating module 113 allocates the normal task NT1 to another core 21 other than the target core 22 of the multi-core processor 20. Thus, the task allocating module 113 inserts the normal task NT1 into the normal task list queue NL1 of the another core 21.

As a result, in a situation in which the target core 22 processes the expectable tasks ET1 and ET2 which should be processed periodically, since the normal task NT1 is not newly allocated to the target core 22 but rather is allocated to another core 21, it is possible to prevent problems such as preoccupancy and delay between the expectable tasks ET1 and ET2 and the normal task NT1 in advance. Furthermore, since the another core 21 processes the normal task NT1 in parallel with the expectable tasks ET1 and ET2 being processed by the target core 22, it is possible to improve the performance, while efficiently using the resources of the computing device 1.

Furthermore, in some embodiments of the present disclosure, the expectable task managing module 111 may move tasks inserted into the expectable task list ETL to the normal task list NTL or move the task inserted into the normal task list NTL to the expectable task list ETL.

Specifically, as a result of analyzing the task inserted into the expectable task list ETL, if an execution pattern is not included and it is decided that future prediction is not possible, the tasks previously classified as the expectable task ET may be newly classified into the normal task NT and may be moved to the normal task list NTL. Likewise, as a result of analyzing the task inserted in the normal task list NTL, if it is decided that the task inserted in the normal task list NTL has a future expectable execution pattern, the task previously classified as the normal task NT may be newly classified as the expectable task ET and may be moved to the expectable task list ETL.

In the present embodiment, a case is illustrated in FIG. 5 in which the expectable task managing module 111 newly classifies a task NT2 previously classified as the normal task NT into the expectable task and adds the task NT2 into the expectable task list ETL.

Next, referring to FIG. 6, an example of the result in which the expectable task ET and the normal task NT are distinguished and scheduled by the scheduler 10 according to various embodiments of the present disclosure is illustrated.

In the case of the cores 21 and 24 of the multi-core processor 20, expectable tasks ET and normal tasks NT are allocated to the expectable task list queues EL1 and EL4 and the normal task list queues NL1 and NL2. In the case of the core 22, expectable tasks ET are allocated only to the expectable task list queue EL2, and the normal task list queue NL2 is empty. In the case of the core 23, normal tasks NT are allocated only to the normal task list queue NL3, and the expectable task list queue EL3 is empty.

That is, for example, since the scheduler 20 mainly allocates the expectable task ET expected to be repeatedly executed to the core 22, and does not allocate the normal task NT to the core 22, it is possible to prevent the problems such as preoccupancy and delay described above.

On the other hand, the scheduler 20 may also execute the task scheduling so that the core 23 mainly executes the normal task NT. In this way, when tasks are distributed to the cores 21, 22, 23 and 24 by simply considering the execution pattern, it is possible to improve the performance, while efficiently using the resources of the computing device 1, even without considering amounts of work of the cores 21, 22, 23 and 24, that is, the loads.

It is noteworthy that the core 22 is not fixed to execute only expectable tasks ET. That is, the scheduler 20 may designate the core which mainly executes expectable tasks ET, for example, as the core 23 depending on the operation situation of the computing device 1. That is, according to various embodiments of the present disclosure, the respective roles assigned to the cores 21, 22, 23 and 24 may dynamically change depending on the operating situation of the computing device 1.

Figure 7:
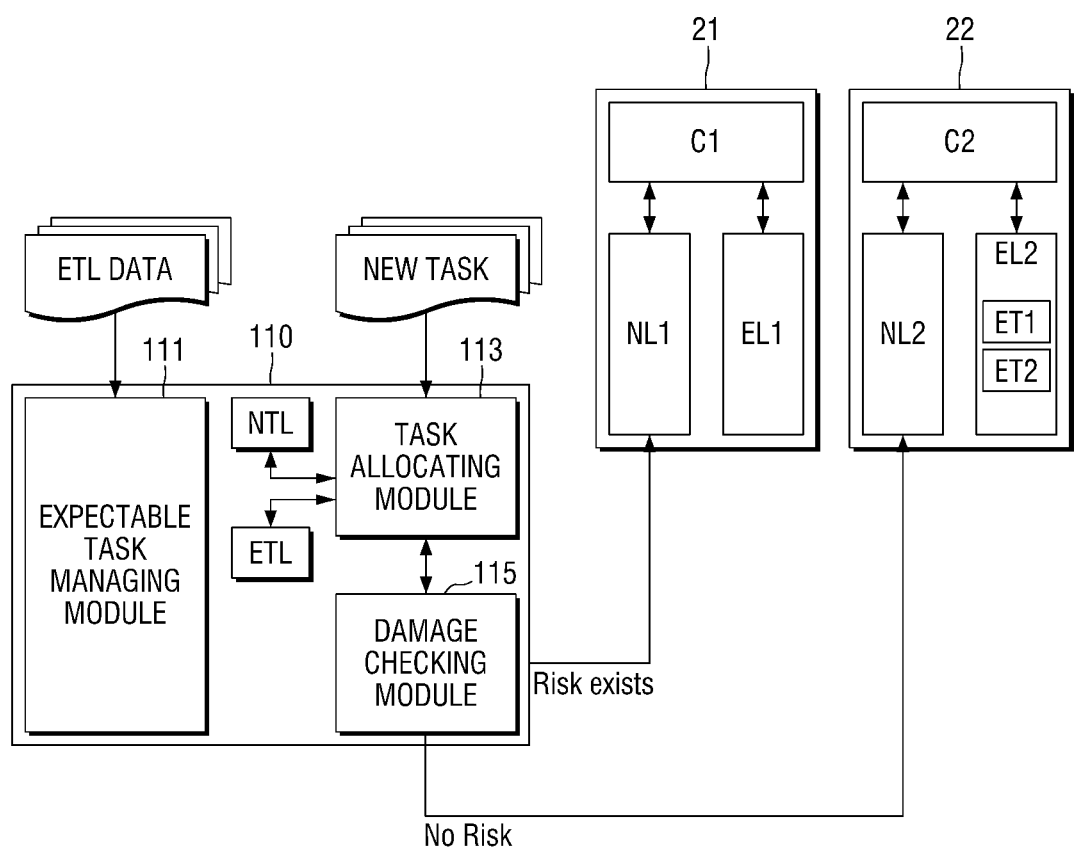
FIG. 7 is a block diagram for explaining a damage checking module in the task allocating and managing module of the computing device according to an embodiment of the present disclosure.

FIG. 7 is a block diagram for explaining the damage checking module in the task allocating and managing module of the computing device according to an embodiment of the present disclosure.

Referring to FIG. 7, the task allocating and managing module 110 of the computing device 1 according to an embodiment of the present disclosure may further include a damage checking module 115.

When the target core 22 is processing the expectable task ET or the expectable tasks ET1 and ET2 are inserted into the expectable task list queue EL2 of the target core 22, the damage checking module 115 may decide whether there is a risk of changing the expectable tasks ET1 and ET2 by the normal task NT1, by comparing the expectable tasks ET1 and ET2 allocated to the target core 22 with the normal task NT1.

When it is decided by the damage checking module 115 that the risk is present(Risk exists), the task allocating module 113 may allocate the normal task NT1 to another core 21 other than the target core 22 of the multi-core processor 20, and if it is decided by the damage checking module 115 that the risk is not present (No Risk), it is possible to allocate the normal task NT1 to the target core 22.

For example, if the normal task NT1 is a task that may be executed for a very short time during the scheduled execution time of the expectable tasks ET1 and ET2, it may be decided that there is little risk of changing the execution schedule of the expectable tasks ET1 and ET2 by the normal task NT1. Also, if the normal task NT1 is a task with a lower priority than the expectable tasks ET1 and ET2, it may be decided that there is little risk of changing the execution schedule of the expectable tasks ET1 and ET2 by the normal task NT1.

In contrast, if the normal task NT1 is a task which is not executed during the scheduled execution time of the expectable tasks ET1 and ET2 or in which the execution time is very long even when executed during the scheduled execution time, it may be decided that there is high risk of changing the execution schedule of the expectable tasks ET1 and ET2 by the normal task NT1. In addition, if the normal task NT1 is a task having a higher priority than the expectable tasks ET1 and ET2, it may be decided that there is a high risk of changing the execution schedule of the expectable tasks ET1 and ET2 by the normal task NT1.

According to the present embodiment, it is possible to improve the performance, while avoiding or minimizing the problems such as preoccupancy and delay between the expectable tasks ET1 and ET2 and the normal task NT1, and while efficiently using resources of the computing device 1.

Figure 8:
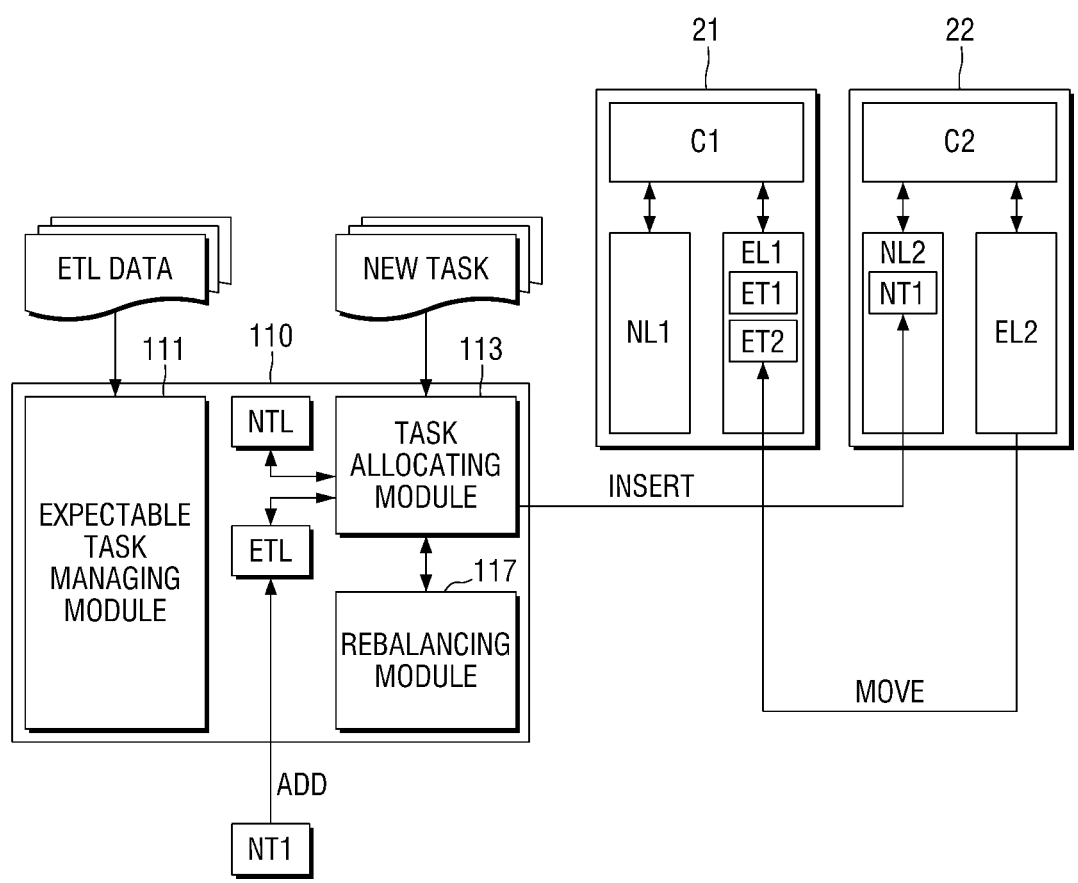
FIG. 8 is a block diagram illustrating a rebalancing module in the task allocating and managing module of the computing device according to an embodiment of the present disclosure.

FIG. 8 is a block diagram illustrating a rebalancing module in the task allocating and managing module of the computing device according to an embodiment of the present disclosure.

Referring to FIG. 8, the task allocating and managing module 110 of the computing device 1 according to an embodiment of the present disclosure may further include a rebalancing module 117.

When the expectable tasks ET1 and ET2 are inserted into the expectable task list queue EL2 of the target core 22 (see, e.g., FIG. 5), the rebalancing module 117 may move (MOVE) the expectable tasks ET1 and ET2 from the target core 22 to another core 21 other than the target core 22 of the multi-core processor 20.

After the expectable tasks ET1 and ET2 are moved to the other core 21 by the rebalancing module 117, the task allocating module 113 may allocate a normal task NT1 to the target core 22. That is, the task allocating module 113 may insert (INSERT) the normal task NT1 into the normal task queue NL2 of the target core 22.

For example, it may be necessary for the normal task NT1 to be executed on the target core 22 depending on the specific purpose in implementation. For example, when the target core 22 corresponds to a core that consumes more power than the other cores 21, 23 and 24 but has high performance, and the normal task NT1 corresponds to a heavy task (i.e., a task requiring high power and/or high performance) concerning, for example, a game application, the expectable tasks ET1 and ET2 may be moved to another core 21, and the normal task NT1 may be executed in the core 22.

According to the present embodiment, it is possible to improve the performance, while avoiding or minimizing the problems such as preoccupancy and delay between the expectable tasks ET1 and ET2 and the normal task NT1, and while fluidly using the computing device 1 depending on the purpose of use.

A method for operating the computing device 1 based on the structure of the computing device 1 described above will now be described with reference to FIGS. 9 to 14.

Figure 9:
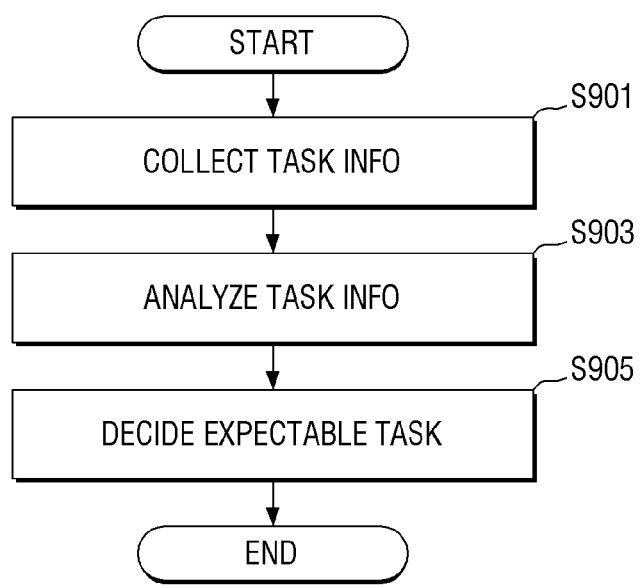
FIG. 9 is a flowchart illustrating operation of the task classifying module of the computing device according to an embodiment of the present disclosure.

FIG. 9 is a flowchart for explaining the operation of the task classifying module of the computing device according to an embodiment of the present disclosure.

Referring to FIG. 9, the method for operating the task classifying module 100 of the computing device 1 according to an embodiment of the present disclosure may include collecting information (TASK INFO) on the task scheduled to be processed (S901), analyzing the collected information (TASK INFO) (S903), and deciding whether the task scheduled to be processed is an expectable task ET on the basis of the analysis result to classify the task scheduled to be processed into the expectable task ET and the normal task NT (S905).

Here, information (TASK INFO) on the task scheduled to be processed may include, for example, various types of information such as task creation information on the initial creation operation of the task, task creation time information, task enqueue information on the operation of allocating the task to the processor (or CPU (Central processing Unit), core), task load update information on the operation of calculating the load of the task allocated to the processor (or CPU, core), task dequeue information on the operation of deleting the allocated task from the processor (or CPU, core), task dead information on the terminal and extinction operation of task, and user specified parameter information, and information may change depending on the purpose of use implementation.

Figure 10:
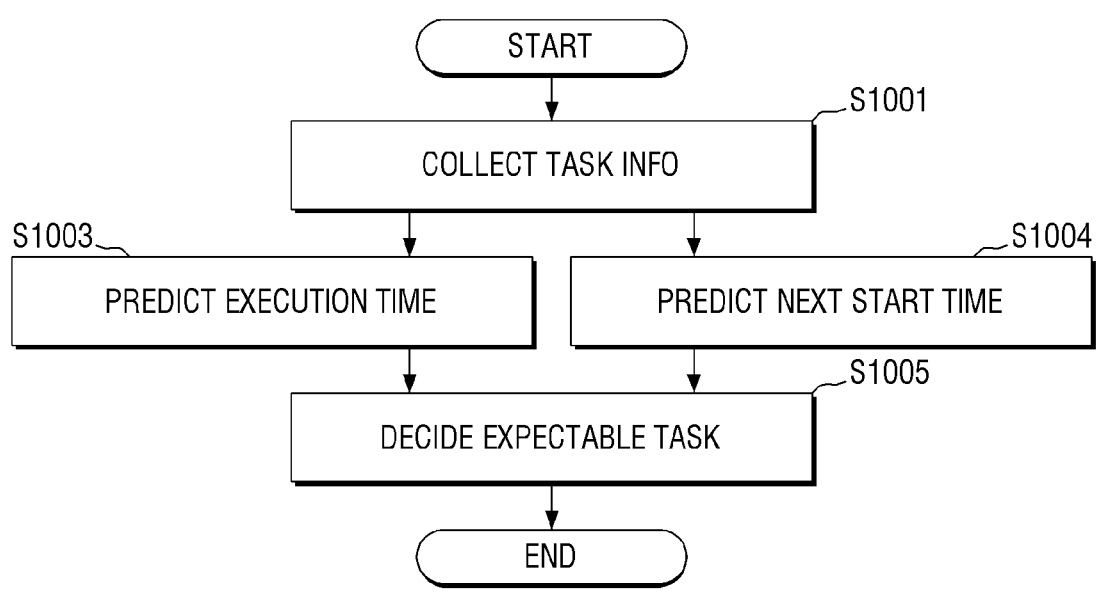
FIG. 10 is a flowchart illustrating operation of the task classifying module of the computing device according to an embodiment of the present disclosure.

FIG. 10 is a flowchart illustrating the operation of the task classifying module of the computing device according to an embodiment of the present disclosure.

Referring to FIG. 10, the method for operating the task classifying module 100 of the computing device 1 according to an embodiment of the present disclosure may include collecting information on the task scheduled to be processed (TASK INFO) (S1001), analyzing the collected information (TASK INFO) to predict an execution time of the task scheduled to be processed (S1003), analyzing the collected information (TASK INFO) to predict a next start time of the task scheduled to be processed (S1004), and deciding whether the task scheduled to be processed is an expectable task ET on the basis of the prediction results to classify the task scheduled to be processed into the expectable task ET and the normal task NT (S1005).

That is, the task scheduled to be processed in which the execution time, the next start time, the number of times of repetition, and the like are decided to have an expectable execution pattern may be classified as the expectable task ET, and the task scheduled to be processed which is a one-time task or in which particular execution patterns are not found may be classified as the normal task NT.

In FIGS. 9 and 10, expectable task list data ETL may be generated as a result of classifying the task scheduled to be processed into the expectable task ET and the normal task NT, and the expectable task list data ETL may be used to manage the expectable task ET by the expectable task managing module 111 of the task allocating and managing module 110.

Figure 11:
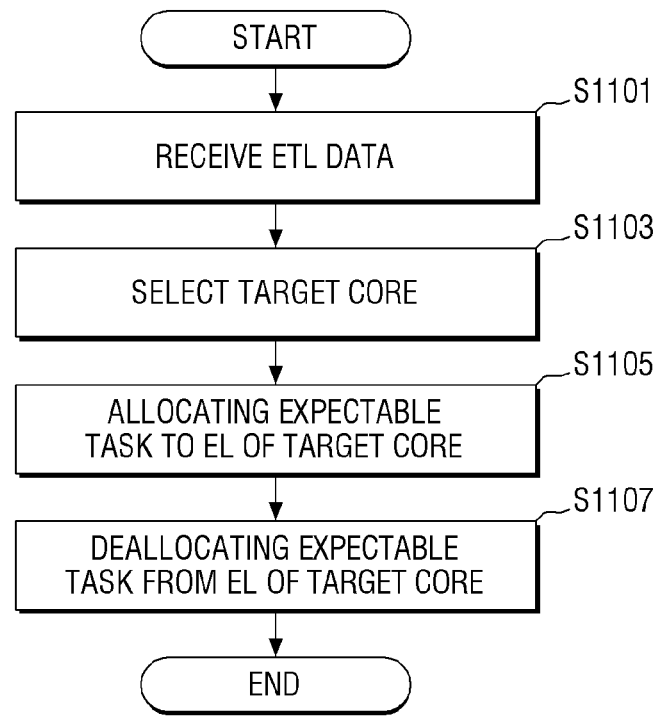
FIG. 11 is a flowchart illustrating operation of the expectable task managing module in the task allocating and managing module of the computing device according to an embodiment of the present disclosure.

FIG. 11 is a flowchart for explaining the operation of the expectable task managing module in the task allocating and managing module of the computing device according to an embodiment of the present disclosure.

Referring to FIG. 11, the method for operating the expectable task managing module 111 in the task allocating and managing module 110 of the computing device 1 according to an embodiment of the present disclosure may include receiving the expectable task list ETL data transferred from the task classifying module 100 (S1101), selecting one of the cores of the multi-core processor 20 as a target core (S1103), allocating the expectable task ET to the expectable task list queue EL of the target core (S1105), and deallocating the expectable task ET from the expectable task list queue EL of the target core (S1107). It should be noted that the allocating and deallocating describe in operations S1105 and S1107 need not necessarily be related to the same task. In other words, operations S1105 and S1107 merely describe two different operations performed by the expectable task managing module 111 as described above. Moreover, in the flowchart shown in FIG. 11, in some embodiments, one of the operations S1105 and S1107 may be omitted.

Further, the expectable task managing module 111 may include management of the expectable task ET and the normal task NT, using the expectable task list ETL and the normal task list NTL. Here, the expectable task list ETL and the normal task list NTL may be a data structure of any type, such as a queue, a stack, a linked list and a table, which may be implemented in the task allocating and managing module 110.

Figure 12:
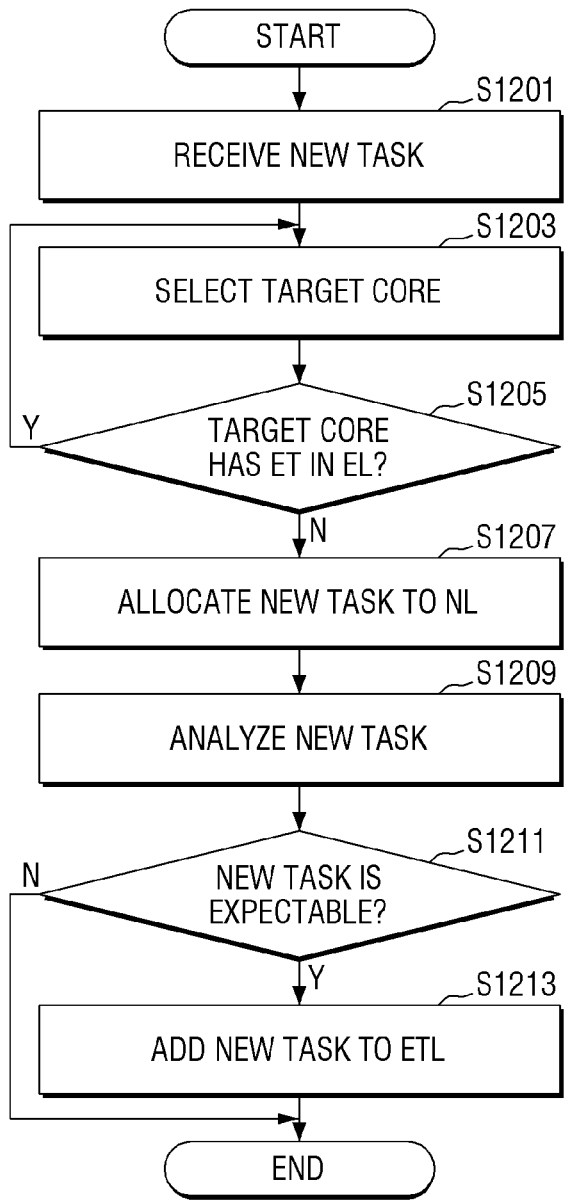
FIG. 12 is a flowchart illustrating operation of the task allocating module in the task allocating and managing module of the computing device according to the embodiment of the present disclosure.

FIG. 12 is a flowchart for explaining the operation of the task allocating module in the task allocating and managing module of the computing device according to the embodiment of the present disclosure.

Referring to FIG. 12, the method for operating the task allocating module 113 in the task allocating and managing module 110 of the computing device 1 according to an embodiment of the present disclosure may include receiving a new task (S1201), and selecting one core of the multi-core processor 20 as the target core 22 (S1203).

Since the task allocating module 113 designates the new task as the normal task NT as a default when receiving the new task, it is decided whether the target core has an expectable task ET in its expectable task queue EL (S1205). If the expectable task ET is inserted into the expectable task list queue EL2 of the target core 22 (S1205, Y), the task allocating module 113 selects another core of the multi-core processor 20 as the target core 21 (S1203).

Alternatively, if the expectable task ET is not inserted into the expectable task list queue EL2 of the target core 22 (S1205, N), a new task is allocated to the normal task list queue NL2 of the target core 22 (S1207).

Additionally, the aforementioned method may include analyzing the new task (S1209). As a result of the analysis, it is determined whether the new task is expectable (S1211). If the new task is decided to be an expectable task (S1211, Y), the new task may be added to the expectable task list ETL (S1213).

Alternatively, if the new task is not decided to be an expectable task (S1211, N), the new task is not added to the expectable task list ETL and the process ends.

Figure 13:
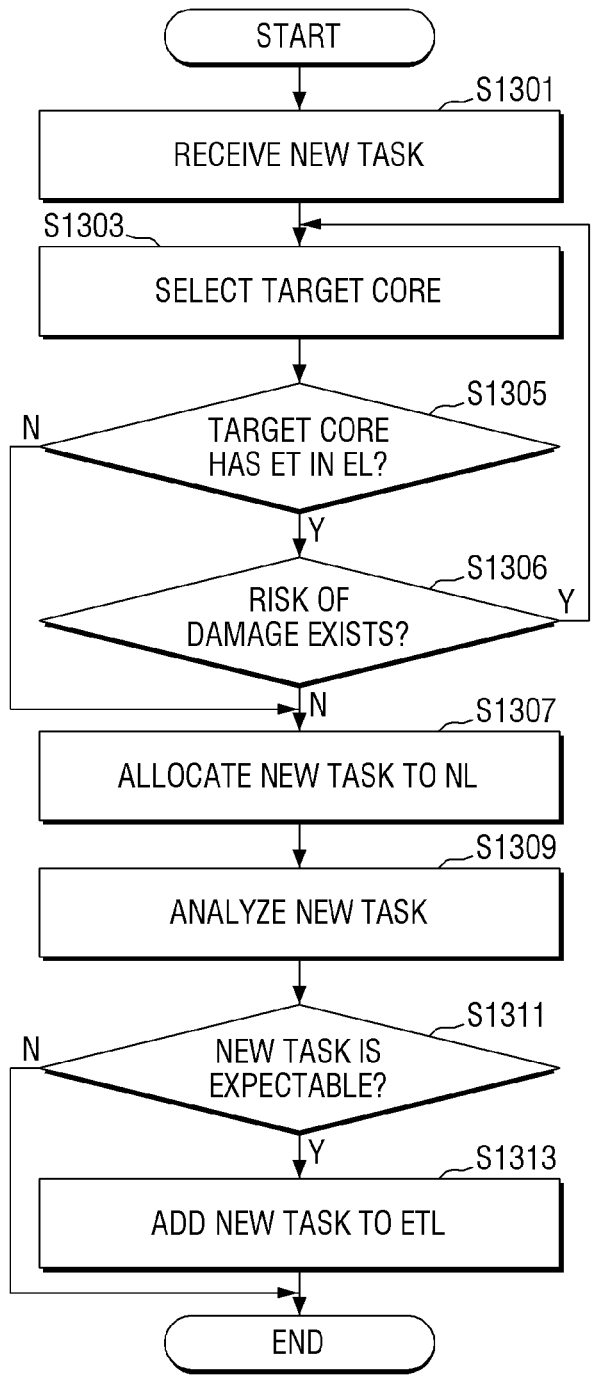
FIG. 13 is a flowchart illustrating operation of the damage checking module in the task allocating and managing module of the computing device according to an embodiment of the present disclosure.

FIG. 13 is a flowchart for explaining the operation of the damage checking module in the task allocating and managing module of the computing device according to the embodiment of the present disclosure.

Referring to FIG. 13, the method for operating the task allocating module 113 in the task allocating and managing module 110 of the computing device 1 according to an embodiment of the present disclosure may include receiving a new task (S1303), and selecting one core of the multi-core processor 20 as the target core 22 (S1301).

Since the task allocating module 113 designates a new task as a normal task NT as a default when receiving the new task, it is determined whether the target core 22 has an expectable task ET in its expectable task list queue EL (S1305). If the expectable task ET is inserted into the expectable task list queue EL2 of the target core 22 (S1305, Y), it is decided whether there is a risk of damage (S1306). That is, it is determined whether there is a risk of changing the execution schedule of the expectable task ET by the new task.

If it is decided that there is a risk (S1306, Y), the task allocating module 113 selects another core of the multi-core processor 20 as the target core 21 (S1303).

Alternatively, if the expectable task ET is not inserted into the expectable task list queue EL2 of the target core 22 (S1305, N) or if the expectable task ET is inserted into the expectable task list queue EL2 of the target core 22 but it is decided that there is no risk (S1306, N), the new task is allocated to the normal task list queue NL2 of the target core 22 (S1307).

Since the contents of the subsequent steps S1309 to S1313 overlap the contents relating to the steps S1209 to S1213 of FIG. 12, their explanation will not be provided again for conciseness.

Figure 14:
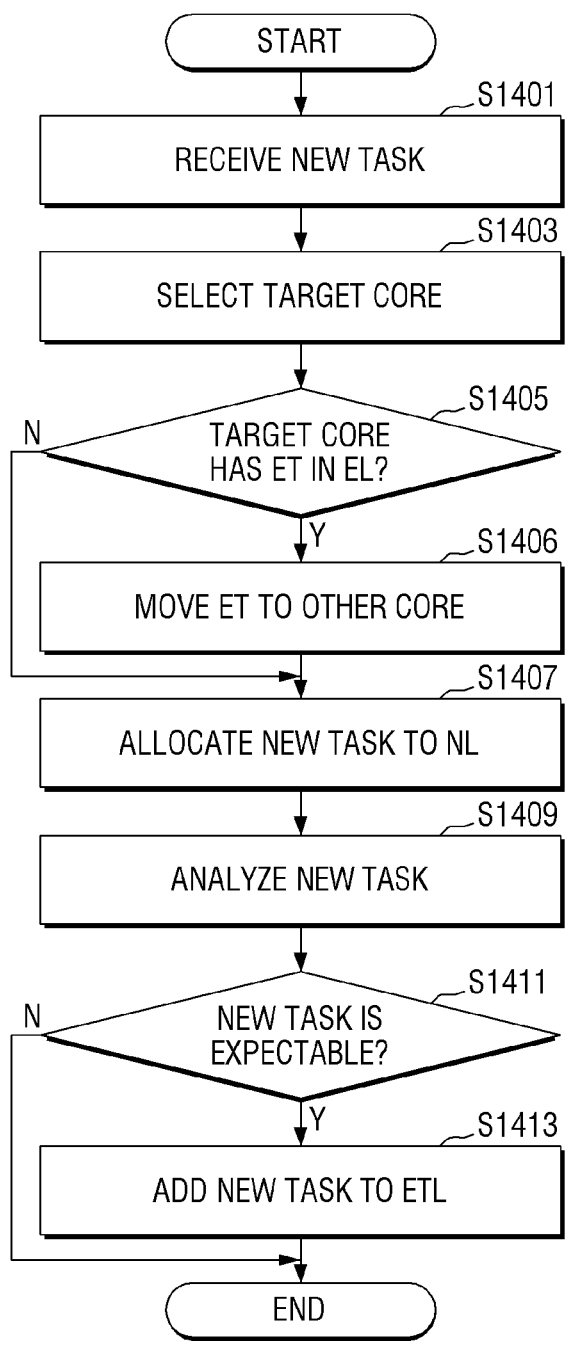
FIG. 14 is a flowchart illustrating operation of a rebalancing module in the task allocating and managing module of the computing device according to the embodiment of the present disclosure.

FIG. 14 is a flowchart for explaining the operation of the rebalancing module in the task allocating and managing module of the computing device according to the embodiment of the present disclosure.

Referring to FIG. 14, the method for operating the task allocating module 113 in the task allocating and managing module 110 of the computing device 1 according to an embodiment of the present disclosure may include receiving a new task (S1403), and selecting one core of the multi-core processor 20 as the target core 22 (S1401).

Since the task allocating module 113 designates a new task as a normal task NT as a default when receiving the new task, it is determined whether the target core 22 has an expectable task ET in its expectable task list queue EL (S1405). If the expectable task ET is inserted into the expectable task list queue EL2 of the target core 22 (S1405, Y), the expectable task ET is moved to the other core. Further, a new task is allocated to the normal task list queue NL2 of the target core 22 (S1407).

Alternatively, if the expectable task ET is not inserted into the expectable task list queue EL2 of the target core 22 (S1405, N), the new task is allocated to the normal task list queue NL2 of the target core 22 (S1407).

Hereinafter, since the contents of the steps S1409 to S1413 overlap the contents of those of the steps S1209 to S1213 of FIG. 12, their explanation will not be provided again for conciseness.

Figure 15:
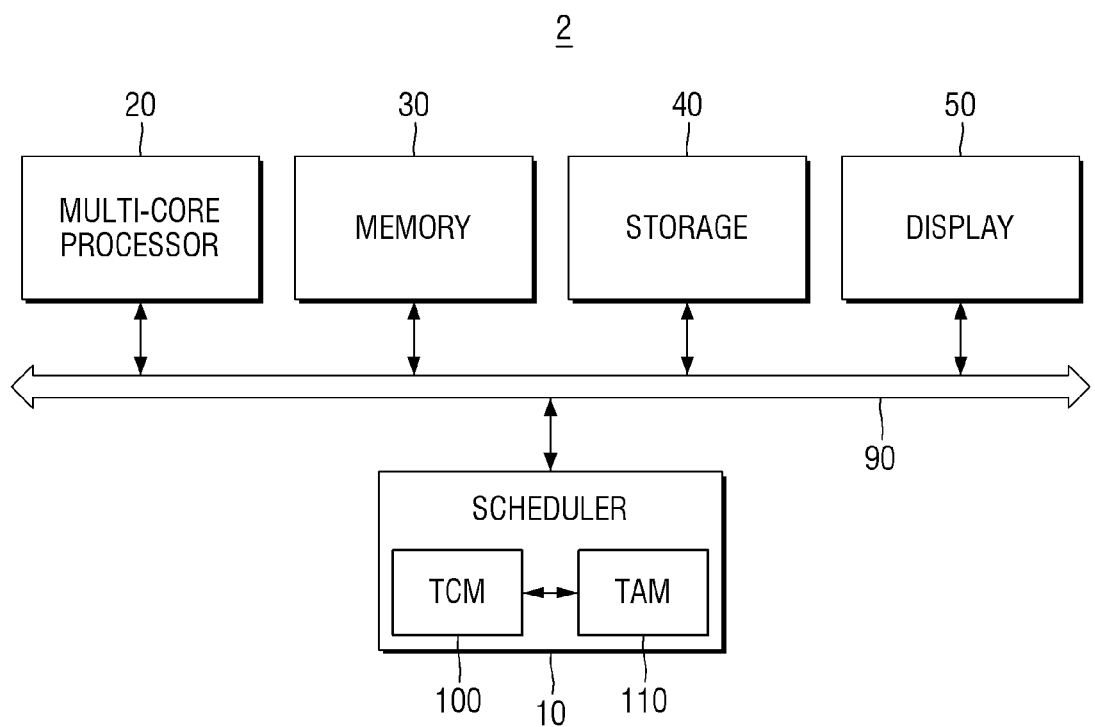
FIG. 15 is a block diagram illustrating the computing device according to an embodiment of the present disclosure.

FIG. 15 is a block diagram illustrating the computing device according to an embodiment of the present disclosure.

Referring to FIG. 15, the computing device 2 according to an embodiment of the present disclosure may be implemented as a computing device that includes the scheduler 10 and the multi-core processor 20 according to various embodiments described above, and a memory 30, a storage 40 and a display 50. The scheduler 10, the multi-core processor 20, the memory 30, the storage 40 and the display 50 may exchange data with each other via the bus 90.

In some embodiments of the present disclosure, the computing device 2 may be implemented as a SoC (System-on-Chip), but the scope of the present disclosure is not limited thereto.

According to the various embodiments of the present disclosure explained above, in a situation in which the target core 22 processes the expectable tasks ET1 and ET2 which should be processed periodically, since the normal task NT is not newly allocated to the target core 22, it is possible to prevent problems such as preoccupancy and delay between the expectable tasks ET1 and ET2 and the normal task NT in advance. Furthermore, since the other cores 21 process the normal task NT in parallel, it is possible to improve the performance, while efficiently using the resources of the computing device 1.

Those skilled in the art will appreciate that many variations and modifications may be made to the embodiments disclosed herein without substantially departing from the principles of the present disclosure. Therefore, the disclosed embodiments of the disclosure are used in a generic and descriptive sense only and not for purposes of limitation.

What is claimed is:

1. A computing device comprising:
   a multi-core processor comprising a plurality of individual cores;
   a task classifying module provided separately from the multi-core processor, the task classifying module being configured to classify each task of tasks to be processed by the individual cores of the multi-core processor into one of an expectable task for which a future execution is predictable based on a current execution pattern, and a normal task for which the future execution is not predictable;
   a task allocating and managing module provided separately from the multi-core processor and configured to:
   receive a new task, of the tasks to be processed, that has been classified;
   select a first core of the individual cores of the multi-core processor;
   compare a priority of the new task that is classified as a normal task with a priority of an expectable task previously inserted into an expectable task list queue specific to the first core,
   insert the new task into a normal task list queue specific to a second core of the individual cores of the multi-core processor when, based on the comparison, allocation of the new task to the first core will change the future execution of the expectable task previously inserted into the expectable task list queue specific to the first core, and
   insert the new task into a normal task list queue specific to the first core when, based on the comparison, the allocation of the new task will not change the future execution.

2. The computing device of claim 1, wherein the task classifying module comprises:
   a task information collecting module which collects information on the task scheduled to be processed,
   a task information analyzing module which analyzes the information; and
   an expectable task deciding module which classifies the task scheduled to be processed based on an analysis result of the task information analyzing module.

3. The computing device of claim 2, wherein the task information analyzing module analyzes the information to derive execution time prediction information and next start time prediction information on the tasks to be processed, and
   the expectable task deciding module classifies each of the tasks to be processed based on at least one of the execution time prediction information and the next start time prediction information of the task.

4. The computing device of claim 1, wherein the task allocating and managing module comprises an expectable task managing module that, for a core of the individual cores, moves a task inserted into an expectable task list queue specific to the core to a normal task list queue specific to the core, or moves a task inserted into the normal task list queue specific to the core to the expectable task list queue specific to the core.

5. The computing device of claim 1, wherein the task allocating and managing module comprises a task allocating module which inserts the expectable task into the expectable task list queue specific to the first core.

6. The computing device of claim 5, wherein, during a time at which the first core is processing the expectable task or the expectable task is inserted into the expectable task list queue specific to the first core, the task allocating and managing module inserts the normal task into the normal task list queue specific to the second core.

7. The computing device of claim 5, wherein the task allocating and managing module further comprises a damage checking module which compares the priority of the new task that is classified as the normal task with the priority of the expectable task previously inserted into the expectable task queue specific to the first core to determine whether the allocation of the new task will change the future execution, during a time at which the first core is processing the expectable task or the expectable task is inserted into the expectable task list queue specific to the first core.

8. The computing device of claim 7, wherein, based on a determination that the allocation of the new task will change the future execution, the task allocating module inserts the new task into the normal task list queue specific to the second core, and based on a determination that the allocation of the new task will not change the future execution, the task allocating module inserts the normal task into the normal task list queue specific to the first core.

9. The computing device of claim 5, wherein the task allocating and managing module further comprises a rebalancing module which moves the expectable task from the expectable task list queue specific to the first core to an expectable task list queue specific to another core of the individual cores other than the first core, at a time at which the new task is inserted into the normal task list queue specific to the first core.

10. The computing device of claim 9, wherein the task allocating module allocates the new task to the first core after the expectable task is moved by the rebalancing module.

11. The computing device of claim 1, wherein the expectable task is a task related to a screen update.

12. The computing device of claim 1, wherein the expectable task includes an aperiodic task that is repeated a plurality of times within a given time span.

13. The computing device of claim 1, wherein the expectable task is a task repeatedly executed with a certain period.

14. The computing device of claim 1, wherein the expectable task is a task repeated a plurality of times but not having a certain period.

15. The computing device of claim 1, wherein the expectable task is a task indicated as an expectable task by a user.

16. A computing device comprising:
a multi-core processor including a first core and a second core;
a task classifying module provided separately from the multi-core processor, the task classifying module being configured to classify each task of tasks to be processed by the multi-core processor into one of an expectable task for which a future execution is predictable based on a current execution pattern, and a normal task for which the future execution is not predictable; and
a task allocating and managing module provided separately from the multi-core processor and configured to:
insert a first task to be processed that has been classified as the expectable task into an expectable task list queue specific to the first core,
compare a priority of the expectable task with a priority of a second task to be processed that is a new task to be processed and has been classified as the normal task,
insert the second task into a normal task list queue specific to the second core when, based on the comparison, allocation of the second task to the first core will change the future execution of the first task, and
insert the second task into a normal task list queue specific to the first core when, based on the comparison, the allocation of the second task will not change the future execution.

17. The computing device of claim 16, wherein the task classifying module comprises:
a task information collecting module which collects information on the tasks to be processed,
a task information analyzing module which analyzes the information, and
an expectable task deciding module which classifies the tasks to be processed based on an analysis result of the task information analyzing module.

18. The computing device of claim 17, wherein the task information analyzing module analyzes the information to derive execution time prediction information and next start time prediction information on each of the tasks to be processed, and
the expectable task deciding module classifies each of the tasks to be processed based on at least one of the execution time prediction information and the next start time prediction information of the task.

19. The computing device of claim 16, wherein the task allocating and managing module comprises an expectable task managing module which moves the first task from the expectable task list queue specific to the first core to the normal task list queue specific to the first core, or moves the second task from a normal task list queue specific to a core to which the normal task has been allocated to an expectable task list queue specific to thea core to which the normal task has been allocated.

20. The computing device of claim 16, wherein the task allocating and managing module comprises a task allocating module which inserts the tasks to be processed.

21. A method for operating a computing device, the method comprising:
classifying each task of tasks to be processed by individual cores of a multi-core processor into one of an expectable task for which a future execution is predictable based on a current execution pattern, and a normal task for which the future execution is not predictable;
inserting a task to be processed that is classified as the expectable task into an expectable task list queue specific to a first core of the individual cores of the multi-core processor,
receiving, by a task allocating and managing module provided outside the individual cores, a new task to be processed;
comparing, by the task allocating and managing module, a priority of the expectable task allocated to the first core with a priority of the new task that is classified as the normal task,
inserting, by the task allocating and managing module, the new task into a normal task list queue specific to a second core of the individual cores when, based on the comparison, allocation of the new task will change a future execution of the expectable task, and
inserting, by the task allocating and managing module, the new task into a normal task list queue specific to the first core when, based on the comparison, the allocation of the new task will not change the future execution.

22. The method for operating the computing device of claim 21, wherein the classifying comprises:
collecting information on the tasks to be processed;
analyzing the information that is collected; and
classifying the tasks to be processed based on a result of the analyzing.

23. The method for operating the computing device of claim 22, wherein the information is analyzed to derive execution time prediction information and next start time prediction information on each of the tasks to be processed, and
each task of the tasks to be processed is classified based on at least one of the execution time prediction information and the next start time prediction information of the task.

* * * * *